Nov. 15, 1927.  1,649,756
J. E. THORNTON
MANUFACTURE OF CINEMATOGRAPH POSITIVE FILMS
Filed Oct. 3, 1925
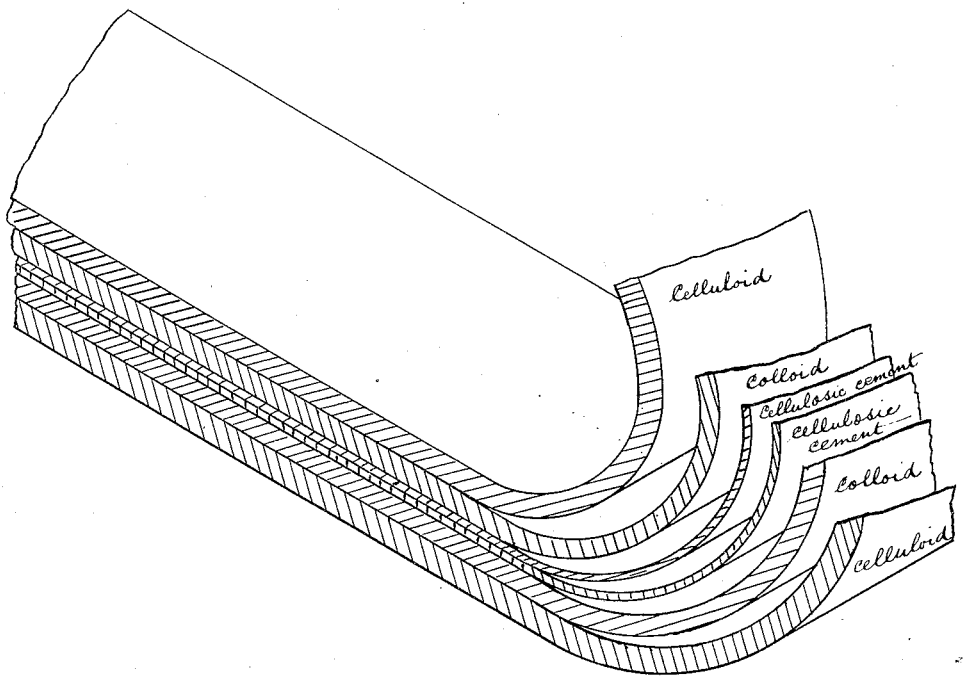
INVENTOR.
John E. Thornton
By
Attorney Patented Nov. 15, 1927.

1,649,756

UNITED STATES PATENT OFFICE.

JOHN EDWARD THORNTON, OF LONDON, ENGLAND.

MANUFACTURE OF CINEMATOGRAPH POSITIVE FILMS.

Application filed October 3, 1925, Serial No. 60,350, and in Great Britain December 19, 1924.

This invention provides an improved process and method for joining together face-to-face (printed-gelatine to printed-gelatine) two thin component films forming parts of a cinematograph film constructed according to any of the following inventions:—Thornton U. S. Serial Nos. 680,511, 711,251; 711,252; 711,253 and 720,127 which describe a film having a scratchless-image enclosed within its body and formed by building up from two thin films cemented together with their images inwards and their transparent celluloid supports outwards.

State of the art.

The satisfactory joining together of two thin cinematograph films by their gelatine faces in such manner that they will permanently hold during the severe strains caused in running through a projector has for long proved an insoluble problem, because the films quickly come apart during use. For that reason it has hitherto been necessary to join them together back-to-back (celluloid-to-celluloid) because such a joint can be easily and perfectly formed by partially dissolving and uniting the two celluloid surfaces with a solvent of celluloid and then putting the two surfaces together under pressure until they become amalgamated as one piece.

But if two such films can be perfectly and permanently joined face to face it thus becomes possible to construct a film with enclosed scratchless images.

The invention is illustrated in the accompanying drawing showing a perspective view of film.

The present invention.

The present invention provides a process and method of effecting a strong and permanent joint between the printed gelatine faces of a two-piece cinematograph film by means of a non-fusible cellulosic cement, without need for the application of heat or use of fusible colloidal cement and insolublizing process.

The drawing is a perspective view of a film embodying the invention.

In carrying out the present invention the printed colloid surfaces of the two films may be joined without any special preparation or treatment of the two faces other than application of the special cement in the special manner hereinafter described; but a better joint is produced if they are prepared and rendered receptive of the jointing cement by roughening or graining the surface, with if necessary the additional preparation of opening the pores of the gelatine or other colloid used.

The colloid surfaces of each of the printed film strips may be roughened, pitted or toothed either mechanically or chemically until it presents a vast number of exceedingly minute points or teeth with depressions or minute recesses between.

*Mechanical toothing.*—The roughening or toothing process may be carried out mechanically by passing the printed film whilst in a dry state between milling rolls, one of which is plain and the other of which has been prepared by sandblasting or in any other way that will give it a finely milled or roughened grainy surface. This milled surface is imparted to and reproduced upon the surface of the printed film by the operation of rolling under considerable pressure.

In the ordinary way this milling of the surface of the film-print produces a "ground-glass" effect so that the picture appears upon a translucent instead of a transparent film, but this translucency is removed and transparency restored by the application of the superimposed layer of transparent cement.

*Chemical toothing.*—The roughening or toothing process may be carried out chemically by etching, which is the method at present preferred.

A suitable etching solution is composed of calcium chloride and potassium ferricyanide and water. No exact proportions need be stated, because they require to be varied according to the make and kind of gelatine used, but as a guide 5 ounces of calcium chloride, 5 ounces of ferricyanide, and 100 ounces of water may be taken as approximate figures. Other chemicals such as zinc-chloride, calcium-nitrate, ferric-chloride, or sodium-chloride are each useful. The etching solution is applied to the dry surface of the film strip.

*Softening the colloid surface.*—If desired the film may be further treated by passing it through an alkaline bath such as a dilute solution of ammonia or caustic potash. This bath has the effect of softening the hard surface and opening the pores of the gelatine, thus enabling the liquid cement to more easily penetrate the printed colloid and become better interlocked therewith.

*Applying the cement.*—The second step of the process is to apply to the surface of (either smooth or roughened or toothed) of the printed film an exceedingly thin layer of the cement, which is made up as a very dilute solution, the composition of which is hereinafter more specifically described.

This solution will flow into all the hollows of the toothed surface, and after its application the coating is dried, preferably slowly, in a dust-filtered drying-room.

To ensure a perfect joint much depends upon the manner in which the cement is applied to the prepared printed colloid surfaces. It is useless to apply a thick coating at one operation and expect it to produce a satisfactory joint. It would not do so, but instead the cellulosic cement layer would, when dry, or certainly during projection, come apart from the printed colloid.

It is instead necessary to apply the liquid cellulosic cement to the printed colloid in the form of a very dilute solution, which will largely penetrate the colloid, and to a lesser extent remain partly upon its surface, thus forming a layer of extreme tenuity. During its application some of the dilute cement will flow into the depressions between the teeth of the film, and in the process of drying will become tightly shrunk upon every one of the vast number of teeth or raised points and become interlocked therewith.

In this manner the printed colloid thick layer is first "faced" with a non-colloid cellulosic layer which is so amalgamated physically and mechanically with the colloid layer that it becomes virtually one therewith and a part thereof. The cellulosic layer is so infinitesimally thin that it does not contract or shorten sufficiently to pull away and peel off, but instead shrinks on to every point of the toothed surface, its firm adherence being further aided by partial penetration into the pores of the gelatine and by physical interlocking with the colloid.

Having, by the means described, succeeded in "facing" the colloid layer with a cellulosic layer (which has entirely different physical character to that of the colloid layer), the process is repeated by further applications of the dilute cellulosic cement, drying and shrinking taking place between each application, until a series of very tenuous layers have been built upon the foundation printed layer, each one partially dissolving and amalgamating with the preceding layer, until a cellulose coating has been attached which is of sufficient thickness to be used for making the joint of the two films.

*Nature of the cement.*—The principle underlying the composition of the cement is that it must combine the following features:—

(1) It must consist largely of a cellulosic compound;
(2) It must be soluble in the usual solvents of such cellulosic compound;
(3) It must contain a solvent or partial solvent of gelatine or whatever colloid is used for the print;
(4) When the solvents and dilutents have all evaporated they must leave behind only the dry cellulosic layer.

These conditions can be met by a cement containing the following elements and mixed in the following proportions:—

*For use with celluloid film.*

| | Ounces or parts. |
|---|---|
| Dry cuttings of celluloid | 10 |
| Glacial acetic acid | 10 |
| Amyl acetate | 10 |
| Acetone | 100 |

*For use with cellulose-acetate film.*

| | Ounces or parts. |
|---|---|
| Dry cuttings of cellulose-acetate | 10 |
| Glacial acetic acid | 20 |
| Acetone | 100 |

The above are given as examples but may be varied, both as to ingredients and proportions according to special requirements. For instance the solvents named in the cellulose-acetate formula are suitable only for certain descriptions of such compound; other varieties may need the addition or substitution of acetylene-tetra-chloride, chloroform, or other solvents.

If greater dilution is desired the proportion of acetone is increased.

If greater flexibility is desired a small proportion of a colloid and a flexite may be added to either of the above, for example:—

| | Ounces or parts. |
|---|---|
| Fish glue, gelatine or glue | 1 |
| Glycerine, golden syrup or sugar | 1 |
| Glacial acetic acid | 5 |

*Applying the cement to the films.*—Before application of this cement the colloid faces of the two films may be toothed or roughened, and if necessary the hard surfaces may also be softened and the pores of the colloid opened as already described (taking care the process is not carried so far as to unduly soften or dissolve the colloid layer). The cement is then applied to each film as a solution and as a coating in an exceedingly thin layer, and it will partially penetrate and be absorbed by the roughened and/or softened printed colloid and at the same time become interlocked therewith as already described. It is next dried, and the application may be repeated two or three times with good effect, the film being again dried between and after each coating.

*Assembling and registering operations.—* The two dry films are now ready for uniting, which is effected by an assembling machine provided with registration pins which exactly fill the perforations of both films. The two films are drawn by the machine from two reels over or around moistening rollers which apply only just sufficient solvent of the cement used to properly moisten and soften or partially dissolve the top surface of the dried cement coating or facing. The registering pins then automatically position the two films with their images in exact register. The films are next automatically clamped between metal blocks which move towards and away from each other with a parallel motion. Or alternatively the films may be passed between a pair of sprocket-toothed rollers. The blocks or rollers may be heated electrically or by other means.

Flat pressure is preferred, applied with a step-by-step picture-by-picture motion; but a combination of flat and rotary pressure may be used if desired.

One form of assembling machine suitable for the purpose is described in the Thornton British Patent No. 12,229 of 1912.

*Keeping the perforations clean.—* In applying the cement to the colloid faces it is necessary to ensure that it does not leave the perforations with thin covers of dried cement. This is effected by passing the cement-coated film between two jets of compressed air, operating one upon the back and one upon the front of the film-strip as it leaves the coating apparatus, the jets being placed not opposite but one in advance of the other, so that as the film travels past them any cement that has crept into the holes is blown clean out, by air-jets acting first from one side then from the other.

After the films have been finally united by their cemented faces, the perforations may be finally cleared by passing the film between a pair of male and female clearing dies having teeth and holes corresponding exactly to the punches with which the perforations were originally made, but with the difference that the teeth are slightly tapered in order to readily enter and gradually clear the edge of each perforation as the full-size portion of the teeth are finally driven home.

*Splicing the ends of two films.*

The usual way of joining the ends of two films of the ordinary one-piece type, known as splicing, is to remove (by a scraper) the picture-image colloid-layer of each film for about one eighth of an inch, and then join the two ends by applying celluloid cement to the narrow bare portions, placing them to overlap, and pressing the two narrow bare celluloid parts together until the cement is dry.

But in the two-ply type of film herein described such method of joining is ineffective, and it is therefore necessary to form the joint by placing between the two films, for a length of say one or two pictures of each of the two ends to be joined, a thin splicing-liner consisting of a strip of very thin celluloid coated upon each side with a thin layer of the jointing cement. This splicing-liner is perforated, adjusted in position, and then pressure applied to the entire joint (together with heat if necessary), so that the two film-faces are adhered to the splicing-liner which is placed inside between the two films. Such a splice makes a much better, smoother and infinitely stronger form of join than the method at present used in standard film, and the liner can be tapered off to a "feather-edge" at each end in the manufacture of the splicing-liner material.

*The finished scratchless-image film.*

When all the processes are completed the finished film-strip of positive pictures will comprise a single-width strip of perforated film of standard thickness, but with its images buried within its interior, and composed of the following layers arranged in the following order, but indissolubly amalgamated as one film:—

*First film.—* (1) A base of celluloid or other transparent waterproof material, which forms firstly a support for layers 2 and 3, of the unprinted film, and also finally, one of the outer covers of the completed film;

(2) An adhesive substratum superimposed upon the base, and indissolubly uniting layers 1 and 3;

(3) A colloid layer superimposed upon the substratum 2, and having a series of complete pictures or component parts of pictures printed thereon; the printed colloid preferably having its face prepared for interlocking in the special manner herein described;

(4) An exceedingly thin layer of special cement as herein described attached to such surface partly by impregnation of its pores and partly by interlocking with its surface teeth;

*Second film.—* (5) An exceedingly thin layer of special cement as herein described, attached to the printed colloid surface 6 partly by impregnation of its pores and partly by interlocking with its surface teeth;

(6) A colloid layer superimposed upon the substratum 7, and having either a series of component pictures complementary to and completing those on colloid layer 3; or alternatively unprinted plain colloid without pictures;

(7) An adhesive substratum superimposed upon the base and indissolubly uniting layers 6 and 8;

(8) A base of celluloid or other transparent waterproof material, which forms firstly a support for layers 6 and 7 of the unprinted film, and also finally the other outer cover of the completed film.

The first film comprising layers 1, 2 and 3, being indissolubly united by its cement layer 4 to the cement layer 5 of the second film, which comprises layers 6, 7 and 8, by the application of pressure (with or without heat) until they are completely welded together and amalgamated with each other.

What I claim as my invention and desire to protect by Letters Patent is:—

1. A process of producing cinematograph film-positives of the scratchless-enclosed-image type built-up from two thin films cemented face-to-face, which consists in applying to the printed colloid-face of each thin film a plurality of exceedingly tenuous facing layers of liquid cellulosic cement and drying said layers separately, thus causing them to amalgamate with each other and causing the cement to penetrate and become absorbed in and amalgamated with each of the printed colloid faces, bringing the two cellulosic facing layers together, applying a solvent for the cellulosic facing layers to such layers to soften them, and applying pressure to cause the softened cellulosic facing layers of the two films to amalgamate, and drying the film to harden said cellulosic facing layers and thus cause them to unite permanently.

2. A process of producing cinematograph film-positives of the scratchless-enclosed-image type built-up from two thin films cemented face-to-face, which consists in applying to the printed colloid-face of each thin film a plurality of exceedingly tenuous facing layers of liquid cellulosic cement and drying said layers separately, thus causing them to amalgamate with each other and causing the cement to penetrate and become amalgamated with and interlocked in each of the printed colloid faces, moistening the cellulosic facing layers with a solvent therefor to soften them, bringing said softened layers together and applying pressure to squeeze the two films together and cause the softened cellulosic layers to amalgamate and unite.

3. A process of producing cinematograph film-positives of the scratchless-enclosed-image type built-up from two thin films cemented face-to-face, which consists in roughening and toothing the printed colloid face of each film, applying to each of the roughened surfaces a plurality of exceedingly tenuous facing layers of liquid cellulosic cement and drying said layers separately, thus causing the cement to penetrate the respective colloid faces and causing said layers to become shrunk on and interlocked with each of the printed and roughened and toothed colloid faces, moistening the two cellulosic facing layers of the two films with a solvent for such layers to soften them, bringing said films together while their respective cellulosic facing layers are softened and applying pressure to squeeze the two films together until the two cellulosic facing layers are united by amalgamation.

4. A process of producing cinematograph film-positives of the scratchless-enclosed image type built-up from two thin films cemented face-to-face, which consists in roughening the printed colloid face of each film, applying to each of the roughened surfaces a plurality of exceedingly tenuous facing layers of liquid cellulosic cement and drying said layers separately, thus causing the cement layers to amalgamate with each other and with the respective colloid faces and causing said layers to shrink on and become interlocked with the respective printed and roughened colloid faces, bringing the two cellulosic facing layers together while softened with a solvent therefor, and applying pressure to the two films until the two softened facing layers are united by amalgamation.

5. A process of producing cinematograph film-positives of the scratchless-enclosed-image type built-up from two thin films cemented face-to-face, which consists in roughening and toothing the printed colloid face of each film, applying to each of the roughened surfaces a plurality of exceedingly tenuous facing layers of liquid cellulosic cement and drying said layers separately, thereby causing the cement layers to amalgamate with each other and with the respective colloid faces and causing said layers to become interlocked with the respective printed and roughened colloid faces, applying a solvent for said cement to said facing layers to soften them, bringing the two softened cellulosic facing layers of the two films together, applying pressure to squeeze the two films together and thereby unite their respective facing layers by amalgamation, and drying the film to harden the facing layers whereby the two films are permanently united.

6. A process of producing cinematograph film-positives of the scratchless-enclosed image type built-up from two thin films cemented face-to-face, which consists in roughening the printed colloid face of each film, applying to each of the roughened surfaces a plurality of exceedingly tenuous facing layers of liquid cellulosic cement and drying said layers separately, thus causing the cement layers to amalgamate with each other and with the respective colloid faces and causing said layers to shrink on and become interlocked with the respective printed and roughened colloid faces, moistening the two cellulosic facing layers with a solvent therefor to soften them, bringing the two softened facing layers together, and applying pressure and heat until the two films are permanently united.

7. The process claimed in claim 1, wherein the cellulosic cement layers are formed of a cellulosic cement composed of a cellulosic base, a solvent to soften it and a solvent to render the colloid face of the films soft and absorbent of the cement.

8. A scratchless-enclosed-image cinematograph film-positive comprising, two thin films each having a layer of printed colloid thereon, said films being joined by a plurality of exceedingly tenuous layers of cellulosic cement which are amalgamated and permanently united to each other and absorbed into and amalgamated with the respective colloid faces substantially as described.

In testimony whereof I have hereunto set my hand.

JOHN EDWARD THORNTON.